United States Patent Office 2,768,214
Patented Oct. 23, 1956

2,768,214

ELIMINATION OF COLOR-FORMING IMPURITIES FROM 1,4-BUTANEDIOL

Clyde McKinley, Westfield, N. J., and James P. Brusie, Bangor, Pa., assignors to General Aniline & Film Corporation, New York, N. Y., a corporation of Delaware No Drawing. Application January 17, 1952, Serial No. 266,996

5 Claims. (Cl. 260—637)

This invention relates to a process of removing color-forming bodies from 1,4-butanediol, substantially without decreasing its butanediol content, by treatment with hydrogen in the presence of a nickel catalyst at a temperature of 150 to 170° C. and a pressure of 50 to 500 atmospheres for about 1 to 10 hours, and distilling 1,4-butanediol which is free from color-forming bodies.

As known to the art, 1,4-butanediol is a commercially interesting material and may be prepared by reacting acetylene and formaldehyde to prepare butynediol, and then hydrogenating to convert it to 1,4-butanediol. The latter process may be carried out at 70 to 140° C. and 300 atmospheres pressure over a nickel-copper-manganese catalyst supported on a siliceous carrier. The 1,4-butanediol may be distilled as a water white product, and this is suitable for many purposes.

However, it is found that when such a product is reacted with a dibasic organic acid chloride to form macromolecules, a considerable amount of color develops, and this is very objectionable if colorless filaments of high tensile strength are desired. It has been determined that even if the above mentioned 1,4-butanediol material is completely saturated, and analyzes better than 99% 1,4-butanediol, it develops considerable color on mixing with an inorganic acid such as hydrochloric, sulfuric, phosphoric, or the like acids. Further studies have indicated that this color-formation is not caused by pure 2-butyne-1,4-diol, pure 2-butene-1,4-diol, or pure 1,4-butanediol. The best explanation seems to be that the color-forming impurities are produced during the hydrogenation and are not peculiar to any one hydrogenation catalyst. These impurities appear only in very minor amounts, e. g. 0.1% by weight, and they have not been isolated or identified. However, their presence is strikingly indicated by their intense color-formation upon mixing with an inorganic acid. Tests have indicated that these impurities could not be removed effectively by distillation or by extraction.

It has been found, in accordance with the invention, that these highly objectionable color-forming impurities may be removed from the 1,4-butanediol material substantially without decreasing its butanediol content by hydrogenating in the presence of a nickel catalyst at a temperature of 150 to 170° C. and a pressure of 50 to 500 atmospheres for about 1 to 10 hours, followed by distilling the 1,4-butanediol as a product which does not develop color when mixed with inorganic acids such as concentrated hydrochloric acid.

The objects achieved in accordance with the invention as described herein include the provision of a process for eliminating color-forming bodies from 1,4-butanediol material by hydrogenation in the presence of a nickel catalyst at elevated temperatures and pressures until the color-forming property is removed, and then distilling the 1,4-butanediol product; the provision of a process for preparing 1,4-butanediol free from color-forming impurities by reacting acetylene and formaldehyde to form butynediol, catalytically hydrogenating this at about 70 to 140° C. and elevated pressures to form 1,4-butanediol (a distilled sample of which gives a black coloration upon treatment with concentrated hydrochloric acid), hydrogenating in the presence of a nickel catalyst at 150 to 170° C. and elevated pressures until a distilled sample of the material shows no color-formation upon mixing with concentrated hydrochloric acid; and other objects which will become apparent as details or embodiments of the invention are set forth hereinafter.

For convenience, the following test has been used as a standard for determining the presence of color-forming bodies in the 1,4-butanediol: Equal volumes of the butanediol or its solutions are mixed with 35% (weight) aqueous hydrochloric acid. After 30 minutes from the time of mixing, the color intensity which develops is measured in a spectrophotometer covering the visual wavelengths (4,000–7,000 Angstroms). The absorption densities give a comparative measure of the amounts of color-forming impurities present in the 1,4-butanediol material; and when this test shows no color-formation, no color-forming impurities are present.

In order to facilitate a clear understanding of the invention, the following preferred embodiments are described in detail:

*Example 1*

A solution composed of 325 parts by weight of distilled 1,4-butanediol (showing much color on addition of concentrated hydrochloric acid and having a M. P. of 18.2° C.) and 475 parts of water was charged into a rocking-type autoclave. To this approximately 41% solution was added 12 parts of a Raney-type nickel catalyst (such catalysts are described in U. S. Patent No. 1,628,190). The autoclave and solution were heated to and maintained at 150° C. for 8 hours. The hydrogen pressure was adjusted to 500 p. s. i. g. (pounds per square inch gauge). During the treatment, small samples of the butanediol solution were periodically removed, filtered and tested for color-formation with concentrated hydrochloric acid. After 7 hours of treatment all of the color-forming impurities were noted to have been eliminated. After this treated butanediol solution was filtered and distilled, substantially all the 1,4-butanediol was recovered as a product which showed no color-formation on addition of concentrated hydrochloric acid and had a melting point of 19.4° C.

Similar runs were made except that the following pressures were used: 100, 300, 900, 1,500, and 2,000 p. s. i. g. At the higher pressures, the rate of removal of impurity is higher, and a preferred pressure is about 1,000 p. s. i. g.

*Example 2*

A solution composed of 325 parts of distilled 1,4-butanediol (showing much color-formation on addition of concentrated hydrochloric acid and having a melting point of 18.2° C.) and 475 parts of water was charged into a rocking-type autoclave. To the solution was added 12 parts of a Raney-type nickel catalyst. The autoclave and its contents were heated to and maintained at 150° C. for 3 hours. During this period the hydrogen pressure was adjusted to 2,000 p. s. i. g. Filtration and distillation of this treated 1,4-butanediol solution yielded 320 parts of 1,4-butanediol having a melting point of 19.6° C. and giving no color development on the addition of concentrated hydrochloric acid.

Similar runs were made with various supported nickel catalysts, e. g., nickel supported on kieselguhr, nickel-copper-manganese supported on a siliceous carrier (prepared by impregnating the silica carrier with a solution of metal nitrates, followed by ignition to the oxides at 600° C. and then by reduction with hydrogen at 270° C. under 3 atmospheres pressure to give a catalyst containing 15% by weight nickel, 5% copper and 0.7% manganese. These nickel catalysts gave comparable results.

Similar runs using other types of hydrogenation catalysts did not remove the color-forming bodies from the butanediol material; such catalysts were iron, palladium on silica, copper-chromium catalyst, and the like. This phenomenon is indeed surprising inasmuch as all of these catalysts are suitable for the conversion of the butynediol to the butanediol. However, only the nickel catalysts are operable for removing the color-forming bodies from the butanediol after it is formed.

*Example 3*

A stationary autoclave was charged with 760 parts of a supported nickel (17%), copper (6%), manganese (0.5%) on silica catalyst. The catalyst was activated by reduction in hydrogen at 300–350° C. and 1500 p. s. i. g. for 12 hours. After the catalyst had cooled to room temperature in the autoclave under hydrogen, it was saturated with water. The excess water was removed and the catalyst was heated under 1000 p. s. i. g. of hydrogen to 150° C. In a rocking autoclave about 400 parts of a 40% (weight) aqueous solution of 1,4-butanediol (containing color-forming material) was heated to 150° C. under 1500 p. s. i. g. of hydrogen. Then this solution was forced under pressure into the stationary autoclave containing the activated catalyst. The transferred solution was maintained at 150° C. and the hydrogen pressure above it was adjusted to 1500 p. s. i. g. The solution was held under these conditions for 6 hours. During this treatment 25 ml. samples were removed at the start and after 1, 2, 3 and 6 hours of treatment. Acid color-formation tests were carried out on these samples, and they demonstrated that almost all of the color-forming impurities had been eliminated after 3 hours of treatment.

*Example 4*

About 19,000 parts of an aqueous 35% 2-butyne-1,4-diol solution was prepared by reacting acetylene and aqueous formaldehyde diluted with a recycle liquid to a maximum formaldehyde content of about 15%, by passing the mixture downward over a copper, bismuth acetylide catalyst supported on granular silica gel at about 5 atmospheres pressure and 90–110° C.; the excess acetylene was separated and recycled, and the liquid product was freed of methanol, unreacted formaldehyde, and propargyl alcohol. This was hydrogenated at 5,000 p. s. i. g. starting at a temperature of 20° C. and keeping the temperature below 70° C. during the major part of the exothermic reaction, after which heat was supplied to raise the temperature to 100° C. The 1,4-butanediol distilled from a small sample of the resulting reaction mixture was water white, had a melting point of 17.5° C. and gave a black color upon mixture with concentrated hydrochloric acid. The liquid mixture was then passed over the same type of catalyst at 150–160° C. and 2,000 p. s. i. g. hydrogen for a residence time of 2½ hours. Then 1,4-butanediol product was distilled therefrom; it boiled at 135° C./15 mm., and its melting point was 20.0° C. It gave no color upon mixing with hydrochloric acid by the above described test method.

Comparable results are obtained following the above described procedure using other concentrations of the butanediol. For economic reasons, the solutions should contain at least about 20% of the 1,4-butanediol and preferably at least about 35% up to about 60%. A wide variety of tests indicate that any nickel-type hydrogenation catalyst is suitable for eliminating the color-forming bodies. The temperatures should be in the range of 150–170° C., and preferably 150–160° C.

Although these temperatures are too drastic for optimum operation in the hydrogenation of the butynediol to the butanediol, tests indicate that they do not adversely affect the butanediol once it has been formed. It is indeed surprising that substantially all the butanediol may be recovered under these conditions, especially in such a highly purified form. Pressures in the range of 50–500 atmospheres are suitable, and a pressure of about 100 atmospheres is preferred. Generally, the elimination of the impurities is completed in about 1–10 hours, and under preferred conditions in about 3 hours.

Although it is convenient to recover the 1,4-butanediol by distillation, any other convenient method, such as extraction with a suitable selective solvent, may be employed.

Variations and modifications of the invention will be apparent to one skilled in the art in view of the foregoing disclosures, and it is intended to include within the invention all such modifications and variations except as do not come within the scope of the appended claims.

We claim:

1. A process for treating 1,4-butanediol material, which is substantially free of unsaturated impurities but which contain impurities developing a dark color on treatment with concentrated hydrochloric acid, for removing such color-forming bodies therefrom, substantially without decreasing its butanediol content; which comprises treating said butanediol material with hydrogen in the presence of a nickel catalyst at a temperature in the range of 150 to 170° C., and a pressure in the range of 50 to 500 atmospheres, for a time in the range of 1 to 10 hours, and recovering the 1,4-butanediol as a product which does not develop color in 30 minutes after mixing with concentrated hydrochloric acid.

2. The process of claim 1 wherein the pressure is 100 atmospheres.

3. The process of claim 1 wherein the temperature is in the range of 150 to 160° C.

4. The process of claim 3 wherein the pressure is 100 atmospheres and the time is 3 hours.

5. The process of claim 3 wherein the 1,4-butanediol is in the form of an about 35% aqueous solution and the catalyst is a nickel-copper-manganese catalyst supported on silica gel.

References Cited in the file of this patent

UNITED STATES PATENTS

| | | |
|---|---|---|
| 2,222,302 | Schmidt et al. | Nov. 19, 1940 |
| 2,276,142 | Atwood | Mar. 10, 1942 |
| 2,319,707 | Reppe et al. | May 18, 1943 |
| 2,389,347 | Dreyfus | Nov. 20, 1945 |
| 2,525,354 | Hoog et al. | Oct. 10, 1950 |
| 2,569,671 | Hughes et al. | Oct. 2, 1951 |
| 2,570,157 | Rodman | Oct. 2, 1951 |
| 2,585,816 | Mertzweiller | Feb. 12, 1952 |
| 2,629,686 | Grosser | Feb. 24, 1953 |

FOREIGN PATENTS

| | | |
|---|---|---|
| 508,944 | Great Britain | June 26, 1939 |